June 26, 1956

J. E. VALENTINE 2,751,963

MACHINE FOR MAKING POWDER PUFFS SACHET
PACKETS AND ROUGE APPLICATORS

Filed April 7, 1951

INVENTOR.
J. E. VALENTINE.
BY
Howard P. King
ATTORNEY.

June 26, 1956

J. E. VALENTINE

2,751,963

MACHINE FOR MAKING POWDER PUFFS SACHET
PACKETS AND ROUGE APPLICATORS

Filed April 7, 1951

INVENTOR.
J. E. VALENTINE.
BY Howard P. King
ATTORNEY.

June 26, 1956

J. E. VALENTINE

2,751,963

MACHINE FOR MAKING POWDER PUFFS SACHET
PACKETS AND ROUGE APPLICATORS

Filed April 7, 1951

INVENTOR.

J. E. VALENTINE.

BY
Howard P. King

ATTORNEY.

United States Patent Office 2,751,963
Patented June 26, 1956

2,751,963

MACHINE FOR MAKING POWDER PUFFS, SACHET PACKETS, AND ROUGE APPLICATORS

Joseph E. Valentine, Caldwell, N. J., assignor to Valcourt, Inc., New York, N. Y., a corporation of New York Application April 7, 1951, Serial No. 219,880

12 Claims. (Cl. 154—1.8)

This invention relates to machines and more particularly to a machine for making powder puffs and the like.

In the manufacture of powder puffs, sachet packets, rouge applicators and the like, methods have been employed attempting to produce a pliable container wherein the powder or other material-applying surface is one uninterrupted area having a rounded peripheral edge which is a continuation of said area. In general in the past it has been found desirable to provide a velour facing member which constitutes the applying surfaces and which is curled inward over itself in part and sealed at the curled-in edge by an appropriate top closure. The sealed structure usually contains some type of filler. Until a few years ago, said top closure was in most instances stitched either wholly or partly by hand to the body or main surface member. This stitching operation is not conducive to high-speed manufacture or automatic production methods and results in high costs.

However, as explained in my U. S. Patent 2,337,695 of December 28, 1943, it was found that the stitching of the top closure could be eliminated by use therewith of a thermo-adhesive and, by application of pressure and heat, the top closure could be sealed to the body or facing member. The mentioned patent showed a hand tool for the purpose, but its use was not sufficiently time-saving and the need for a more rapid tool or mechanism has existed until the present invention.

Hence it has been found advantageous, according to my invention, to employ a multi-station high-speed automatic machine for the manufacture of powder puffs and the like. The machine consists of a circular work table, rotatable on a horizontal platform of a suitable base. Illustrative of multi-station construction and operation, a four-station machine has been arbitrarily selected, and in sequence of operations, the stations will be referred to as from one to four, station one serving both for starting point and finishing or discharge point. Accordingly, in the selected showing, the rotatable work table has four female dies or moulds therein so that with each quarter-turn advancement or rotation of the work table, each mould is brought to position of the next station, and finally in the cycle of revolution of any one mould that mould returns to its starting position, or station 1, and then starts the cycle of its revolution over again.

Supported by the base is a superstructure which mounts a spider reciprocably, but non-rotatably, above the rotatable table, and this spider has three depending upper dies which axially align with the moulds thereunder when the table is at rest at any one of its indexed positions. The superstructure also mounts a fluid or other drive means for reciprocating the spider and its dies. In the present showing, air under pressure, say sixty pounds to the square inch, is utilized as the motive power for the fluid drive. Another fluid drive means is provided for indexing the table, and indexing is timed to occur only in proper relation to the reciprocation of the spider and upper dies. Series-connected operator-controlled trip valves, co-operate with other mechanisms inclusive of an air relay valve, control valve and other valves and connections to set the parts in motion for each indexed position and to advance the table to the next indexed position. As both hands of the operator have to be used to trip the trip valves, there is no danger of hands being caught by the dies or other moving parts.

In the four-station construction of machine shown, the last-finished puff is discharged at station 1 and the facing material for another puff is positioned above the lower die at the same station. There is no upper die or piston at station 1. At station 2, the filler is applied in the under end of the upper piston and when this piston is depressed, the facing material is carried to the bottom of the lower die or mould and the filler laterally expanded and left therein. At station 3 the margin of the facing material is pressed into place on top of the filler by a heated plunger. At station 4, a top closure for the puff is pressed and embossed by a heated plunger, and by inclusion of a thermo plastic, said top closure is thereby sealed upon the inturned margin of the facing material by the same heated plunger and at the same time as the pressure and embossing is applied. Since the sealing at station 4 requires approximately four seconds whereas the other stations can operate on a two second index of rotation, the machine index can be reduced to two seconds by the addition of a duplicate of station 4 as an additional station 5 if so desired.

An object of the invention is to provide a machine adapted to fabricate powder puffs and the like properly shaped and sealed, and at a speed conducive to economical commercial production.

Another object is to provide a machine which will carry a puff through its several steps of fabrication as other puffs follow through and have fabricating steps performed thereon simultaneously with subsequent steps performed on the first puff.

Yet another object of the invention is to perform the curling or rolling of the edge of the facing material with regularity of disposition and to avoid humps in the inwardly bent margin; also to produce a marginal surface of inturned material of adequately regular character to be sealed by a closure with intervening thermo-plastic.

Another object of the invention is to provide for appropriate timing of plunger operation and retention in depressed position.

Again, an objective is to provide for the indexing of the rotatable table through a considerable angle and yet with facility and accuracy.

Still further objects of the invention will appear to those skilled in the art to which it appertains as the description proceeds, both by direct recitation thereof and by implication from the context.

Referring to the accompanying drawings in which like numerals of reference indicate similar parts throughout the several views:

Fig. 6 is a sectional view of line 6—6 of Fig. 4, and showing the positioning of the outer facing material at station 1;

Figures 7, 8 and 9 are sectional views on line 7—7 of

Fig. 4, and showing three operational positions of the upper plunger and puff fabrication at station 2;

Figures 1, 2, 3:
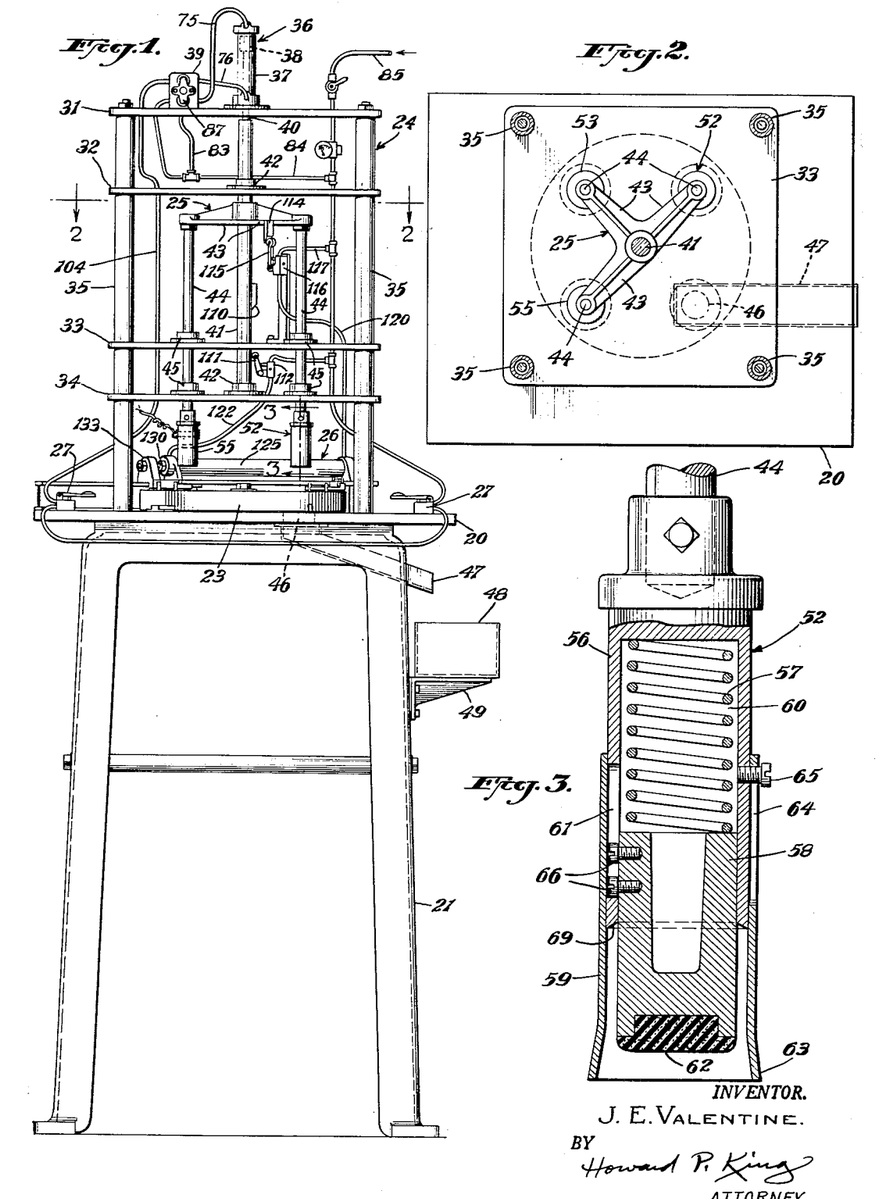
Figure 1 is a front elevation of a machine embodying the present invention.
Figure 2 is a cross-section on line 2—2 of Fig. 1.
Figure 3 is a longitudinal section of the shaping plunger of station 2 of the machine, on line 3—3 of Fig. 1.
Figure 4:
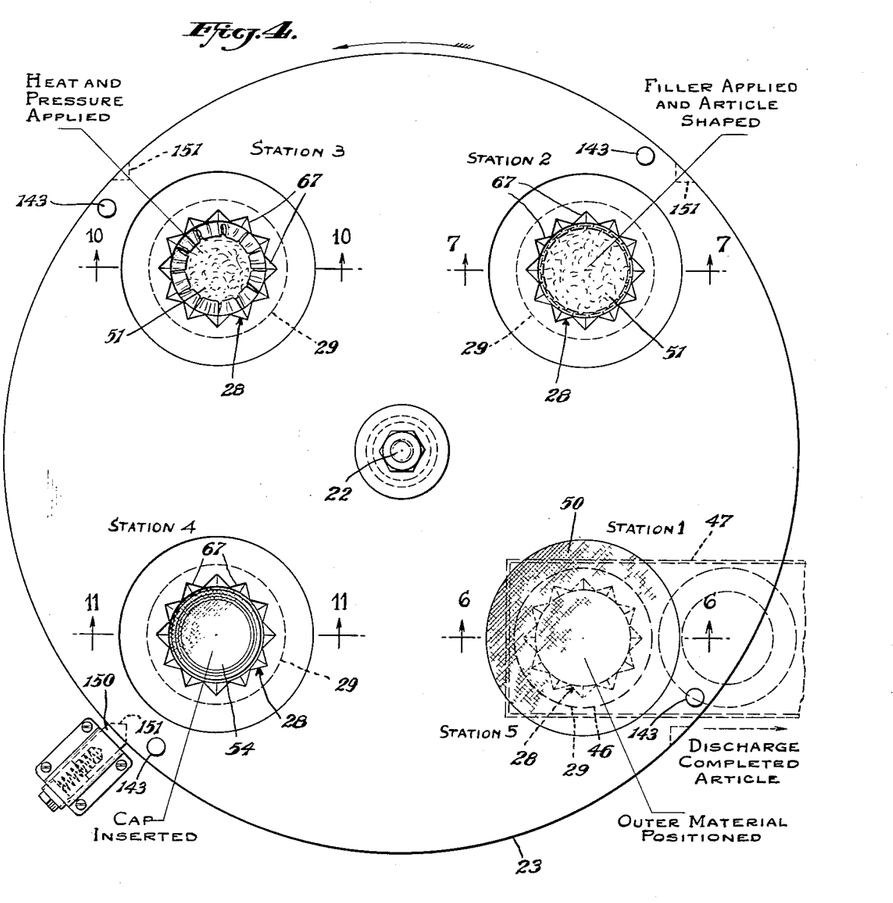
Figure 4 is a plan of the rotatable work table of the machine and showing the four week stations of the selected embodiment of a four-station machine.
Figure 5:
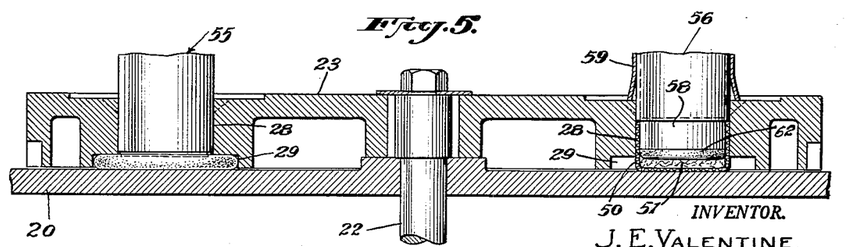
Figure 5 is a vertical section of the said table taken diametrically thereof through the moulds or lower dies and showing the upper dies or plungers depressed into said moulds and performing their operations therein.

Referring now to the accompanying drawings, and initially to Figure 1, the reference numeral 20 designates a substantially flat rectangular metallic platform as part of what is shown as a four-legged supporting base 21. Rotatable axially counter-clockwise on said platform 20, by means of a vertical shaft 22 (see Fig. 5) is a circular work table 23. Supported on said base, and straddling the work table is a superstructure 24 which, inter alia, supports a spider 25 above and coaxial to the work table 23. Said spider is adapted to have vertical or axial reciprocation, but is non-rotatable. The table 23 is given an indexing or partial rotation each time the spider moves to its uppermost position. For indexing or intermittently rotating the work table, a pneumatically actuated mechanical drive or indexing mechanism 26 is shown at the rear of the platform and work table. According to the present showing, reciprocation of the spider is obtained through the agency of a pneumatic drive, and to instigate the reciprocating cycle, two trip-valves 27 are arranged in series and one at each side of the machine toward the front thereof so as to require the operator to use both hands to set the spider in motion.

Viewing the machine in somewhat greater detail, said work table 23, which may appropriately be made of hard steel, has, in the present showing, four lower female dies or moulds 28 of generally cylindrical configuration and extending entirely through the work table from top to bottom thereof. The bottom of the work table at the areas thereof around the lower ends of the die cavities, is very close to the top face of the platform which therefore constitutes the bottom wall for the said lower dies or moulds. The axes of the several moulds are in a circular series equi-spaced from the center of the table and from each other. Said moulds are located proximate to the periphery of the table and are diametrically considerably smaller in dimension than the radius of the table, and all of the moulds are of a single size and shape. Description of one of the moulds will therefore suffice for all. The major portion of the depth of the mould is of less diameter than intended for the completed puff, and the bottom end of the mould has an enlargement or counter-bored portion 29 having depth and diameter corresponding to the desired thickness and diameter of the finished article. At the upper end of the mould, the margin thereof has a serrated chamfer to insure bending, at regular intervals, of the facing member of the article being manufactured during the shaping operation.

The superstructure 24 here shown, comprises a series of four flat, parallel and horizontally disposed mounting plates, identified in order from top to bottom by numerals 31, 32, 33 and 34. These plates are all of similar construction, and are shown as having rectangular configuration and supported at their four corners by four pipe-like stanchions or posts 35. Said posts are secured to and stand upright from platform 20. The top mounting plate 31 supports certain of the operating and control mechanisms, namely, an axially situated pneumatic-mechanical drive 36, comprising a vertical cylinder 37 and piston 38 for actuating spider 25, and also supports a control valve housing 39 and a relay valve 77.

The pneumatic-mechanical drive further includes a piston rod 40 projecting from the piston 38 downwardly out of the lower end of cylinder 37 and through mounting plate 31 and is secured to the upper end of a slide bar 41 which extends vertically through the other mounting plates 32, 33 and 34 the first and last mentioned of which have flanged bushings 42 to guide the bar, whereas the other plate 33 passes the bar freely therethrough. Aforementioned spider 25 is fast upon said bar at a part thereof between the middle two mounting plates 32 and 33.

For the specific four-station machine here selected for illustration of the invention, the spider 25 has three arms 43, of which two are on a common diametric line through bar 41, whereas the third arm is perpendicular to that line and also radial from the bar. Each said arm, next its outer end, has the upper end of a die shaft 44 fixed thereto, each shaft depending from the spider parallel to said bar and passing through and guided by flanged bushings 45 mounted on the two lower mounting plates 33 and 34. At the indexed positions of the rotatable work table, the moulds thereof and the die shafts 44 are in axial alinement. Each die shaft carries a die, hereinafter described, at its lower end, and with each downward movement of the spider the three dies, referred to generally as upper dies, enter the underlying moulds of the work table to perform their respective functions on the work.

At station 1, where there is no upper die, the platform 20 is provided with a discharge hole 46 therethrough with which the mould indexed to that station will be in registration. An article which has been fabricated in passing through the several stations and arrives back at station 1 over said hole, is discharged therethrough. A trough 47 sloping downwardly toward the side of the machine passes the article to a suitable receptacle 48 on a shelf 49 provided for the purpose. Also at station 1, and as the first step in the cycle of operations, a facing member 50, in flat condition, for another one of the articles to be fabricated, is positioned. A filler pad 51 is inserted in the lower end of a compound die 52, described presently in more detail, at station 2, and the table is indexed to that position and said die is lowered into the mould 28 thereat and the article is initially shaped. The table is indexed again, and a die 53 at station 3 is lowered into the mould 28 thereat, this die 53 applying both heat and pressure. The machine is indexed to station 4, a cap 54 is placed in the mould, and another hot die 55 is lowered into the mould, embossing and sealing the cap in place on the article.

Compound die 52 in work station 2, shown in Fig. 3, comprises a cylindrical metallic body 56 containing a suitable helical compression spring 57 applying depressive moment upon a plunger 58 surrounded, with lost motion accommodation, by an outer sleeve 59 constructed and arranged to slide along the outer surface of body 56. The upper portion of said body 56 has an axial socket 60 at its upper end to receive the lower end of die shaft 44, said end of the die shaft and the socketed body being appropriately secured together. The lower portion of body 56 also is hollow and has a suitable vertical slot 61 cut longitudinally in its side wall. Compression spring 57 is interposed in said hollow portion of body 56 exerting resilient depressive moment of force against the upper end of plunger 58 which has sliding contact with the inner walls of said lower hollow portion of body 56. The lower or working end of the plunger 58 may be recessed or otherwise constructed to mount a suitable cushion or other tip 62 thereat as a termination for the said lower end of the plunger covering the entire lower face thereof.

Outer sleeve 59 is a hollow metallic cylinder having a flared-out lower contact end 63 for making contact with the upper surface of work table 23, and has interior sliding engagement with the outer surface of the lower hollow portion of body 56. A vertical slot 64 of approximately the same length as and opposite slot 61 in body 56, is cut lengthwise of the side wall of sleeve 59 and terminates near the top of said sleeve. A set-screw 65 threaded into body 56 radially thereof through the sleeve and slot, constitutes a stop which limits the vertical travel of sleeve 59 with respect to said body 56. The heads of two similar set screws 66, the shanks whereof are suitably threaded into the plunger 58 radially thereof, are located in slot 61 in the side wall of body 56 between sleeve 59 and plunger 58, and align and limit travel of plunger 58 with respect to body 56. On the downward stroke of die shaft 44, the flared contact end 63 of outer sleeve 59 is brought into engagement with the upper surface of the piece of work positioned by the operator over the mould in the work table 23, following which, plunger 58 continues downward by virtue of lost motion afforded by slot 64 and set screw 65. During that operation, the cushioned end of the plunger engages the work and, pulling the margin of the work inwardly from under the sleeve, cups the work and forces it down into the mould together with filler pad 51 which was in the lower end of the sleeve between the piece of work mentioned and the cushioned end of the plunger.

In practice, the piece of work above-mentioned, is preferably the velour or other facing member 50 for the device being fabricated, and it is a feature of the present invention to effect a regularity of creasing or lapping of the cupped margin of said facing member as it is drawn into the mould. To obtain this stated desideratum, the margin of the table around the mould is provided with a circumferential series of evenly spaced inwardly and downwardly sloping notches or serrations 67 providing a circular series of apices at the top edge of the mould. As the margin of the facing member 50 is held against the table by the lower end of sleeve 59 during the operation of pulling said margin into its cupped condition in the mould, those apices crease the material and instigate the folds required in the material in its transition from flat to cylindrical condition. The length of the plunger normally protruding below the bottom rim of the body 56 is sufficient, and properly proportioned, to admit all of the margin of the cupped facing member to enter the mould in advance of or below the said bottom rim. Then as the said body 56 continues its downward movement its said bottom rim engages the upper edge of the cupped facing member and pushes the cupped portion downward between the inner face of the mould and the outer face of the plunger. It is found advantageous to bevel the bottom rim of said body 56, as at 69, with the bevel sloping inwardly upward, so as to tend to contract the upper edge of cupped member.

Figures 6, 7, 8, 9:
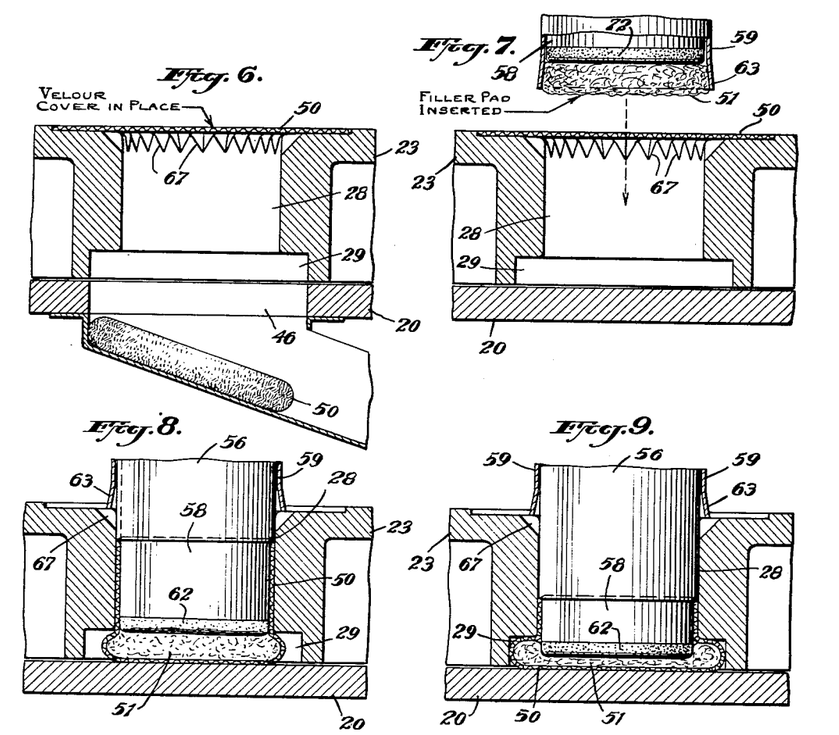

It has been previously stated that the bottom portion of mould 28 provides an enlargement 29, so it may now be readily appreciated that continued depression of the body 56 against the cupped member 50 causes that member to bulge radially into said enlargement. At the same time, the plunger, by virtue of its spring loading, also applies flattening pressure upon filler pad 51, deforming said pad from its original diameter to the larger diameter of the mould enlargement. Wool, cotton and other batts readily respond to this deformation and desired selection is made from this choice of materials for said pad. In practice, the plunger compresses the pad, as shown in Fig. 9, more than the desired ultimate thickness of pad, but the natural resiliency of the pad material returns the pad to its desired thickness when the pressure of the plunger is withdrawn. This extra compression during fabrication is desirable to effect the lateral deformation with sufficient permanence that the pad will retain substantially the enlarged diameter given to it. Obviously the radial expansive deformation applied to the pad also assists in bulging the facing member radially into the enlargement 29 of the mould. In view of the creases or folds in the cupped facing material, in addition to the contracting moment applied by the bevel of the die body, the remaining upstanding margin of the cupped material will tend to drop inwardly toward the horizontal when the plunger is withdrawn, and will thus be ready to be flattened by the die at the next station.

The next step accordingly is to raise the several dies from the moulds and index the table so the mould with the partly formed article above described will be located at station 3 in axial alignment with upper die 53. Said die 53 is shown as of a size and cross-sectional shape to substantially fit the mould, and has a lower flat face which will engage and flatten the inwardly directed margin of the facing member 50. It is preferable to employ a hot die at this station 3, and for that purpose said die 53 is shown equipped with an electric resistance coil 70 connected by suitable lead-in wires 71 to an appropriate source of electric current.

Figures 10, 11, 12:
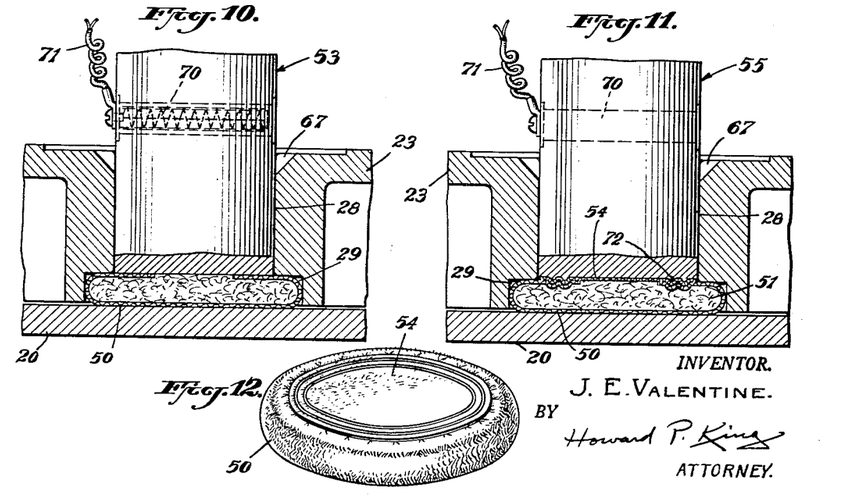
Figures 10 and 11 are sectional views on lines 10—10 and 11—11 respectively of Fig. 4, and showing the upper plungers in the lower dies or moulds in operational positions on the puff.
Figure 12 is a perspective view of a completed puff.

At station 4, to which the table is next indexed, another heating die 55 is shown, likewise of proper size and configuration to substantially fit the mould brought to axial alignment therewith. This die 55 is, for the most part flat on its under face, but may be provided with desired embossing means, such as the two annular ribs 72 indicated in Fig. 11. Said die 55 is likewise equipped with a heating coil and electric current lead-in wires 71 corresponding to those above described as used with heating die 53. Before said die 55 is lowered, a cap 54 for the article, preferably of a size to fit the upper part of the mould so as to be properly centered, is introduced horizontally into the mould. Then, as the die is lowered, said cap is pressed onto the flattened margins of facing member at the top of the pad. The under face of the said cap 54 is coated or otherwise rendered thermo-adhesive, and accordingly will be permanently secured by the heat and pressure of the die to the said margin of the facing member and thus constitutes a complete closure for the article. Inasmuch as the embossing ribs 72 of the die are superposed to both the cap 54 and the in-turned margin of the facing member, the additional pressure exerted by those ribs will assure complete circular lines of sealing between said cap and member.

To avoid delay in indexing to afford adequate time for the heat-pressing operations, it is deemed within the scope of the invention to include as many heat-pressing stations in duplication of either or both of stations 3 and 4 as found desirable, and thus enable the machine to be indexed at a speed commensurate with time required by an operator to load the machine with the parts of the article being made.

The mechanical-pneumatic drive 36 for moving spider 25, and the several dies carried thereby, up and down, comprises the afore-mentioned cylinder 37 and piston 38 therein, both ends of the cylinder being closed for operating the piston in both directions by pneumatic pressure. For proper admission and exhaust of the high-pressure air to and from the two ends of the cylinder, there is provided a four-way control valve unit 39, which is shown conveniently mounted on top mounting plate 31 in proximity to said cylinder. One air conducting pipe 75 from the top of the cylinder, and a lower air conducting pipe 76 from the bottom of the cylinder lead to said valve unit which is suitably constructed to properly admit and exhaust the air as needed for operation of the piston. In turn, the control valve unit 39 is connected to a high pressure air relay or timer 77 by a pipe 78. This relay is operated by air conducted thereto by a pipe 104 leading from the series-connected trip valves 27.

Figure 14:
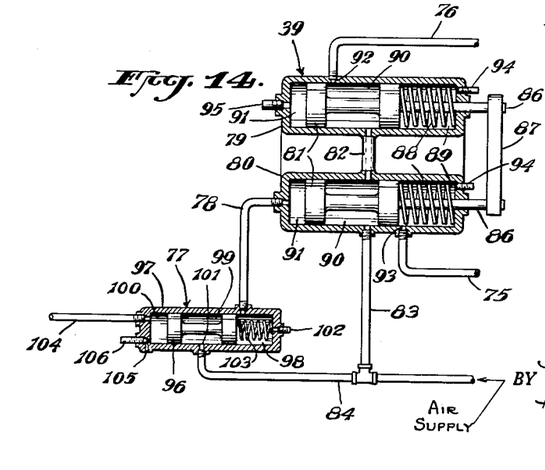
Figure 14 is a sectional view of the relay and plunger-control valves.

Illustrative of one embodiment of four-way control valve unit 39, reference is made to Figure 14, wherein is shown a pair of preferably cylindrical valve housings 79, 80 in each of which is a D-valve or dumb-bell piston 81. A pipe or other connection 82 extends from one housing 79 to the other housing 80 and always open to the dumb-bell hollows medially of the housings. High pressure air has continuous admission to one of said housings, as 80, into the dumb-bell hollow of the piston in that housing, and therefore also has continuous admission by said connection 82 to the hollow of the other dumb-bell piston. Said admission of air to the first mentioned hollow is by way of branch pipes 83, 84 from the main air-pressure supply pipe 85.

Further constructional details of the control valve of the present showing includes piston rods 86 each extending from an end of the dumb-bell pistons and projecting from corresponding ends of the valve housings 79, 80. The projecting ends of these piston rods are connected rigidly by a yoke 87 so that both pistons will have corresponding and simultaneous motion longitudinally of their respective housings. Each housing has a spring 88 therein around the piston rod and bearing against the end of the housing and against the piston, tending to move the pistons normally in a direction away from said end and drawing yoke 87 toward the housing. For convenience, the end portion of each housing interior wherein the spring is located will be referred to as the spring chamber 89, and the medial portion having the dumb-bell hollow therein will be designated the constant high pressure chamber 90, whereas the other end portion of the housing interior opposite from the spring chamber will be called the controlling chamber 91.

When the dumb-bell valve piston 81, for instance the one in housing 79, is at the inward end of its stroke under influence of the spring, it uncovers a port 92 to pipe 76 admitting pressure from high-pressure chamber 90 to said pipe and thence to the lower end of the die actuating cylinder 37. Simultaneously, the other dumb-bell piston 81 in housing 80 closes communication of the high pressure chamber 90 of that housing from a port 93 and opens communication of that port with the spring-chamber 89. This last-named port 93 is at the end of pipe 75 leading to the upper end of the die actuating cylinder 37, and hence, in the position of dumb-bell described, pressure in the said lower end of cylinder 37 is released to the spring chamber 89. Both spring chambers have communication with the outside atmosphere, and to prevent pounding of the dumb-bell piston, such communication is shown as a restricted outlet port 94.

When the dumb-bell valve is actuated to its other extreme position, that is, its position which compresses the spring, the two dumb-bell valves cooperate to reverse the air supply and release to the die-actuating cylinder. In this said extreme spring-compressing position, dumb-bell valve piston 81 in housing 79, closes port 92 thereof to the high pressure chamber 90 and opens said port to the control chamber 91 of that housing from which there is an outlet port 95 to the atmosphere. Simultaneously the other dumb-bell piston 81 in housing 80 closes its port 93 to communication with the spring chamber and atmosphere and opens it to communication with the constant high pressure chamber 90. This dumb-bell piston 81 in housing 80 is actuated to its extreme position compressing spring 88, by air pressure admitted by operator control and relay valve 77 to control chamber 91 of said housing 80 through pipe 78.

Introduction and release of air pressure to control chamber 91 of housing 80 is determined by position of a dumb-bell piston 96 in a cylinder 97 of said housing, said piston dividing the cylinder into a spring chamber 98, medial constant high pressure chamber 99 and control chamber 100 in the same arrangement as described above for the control valve. Dumb-bell piston, depending upon which extreme position it occupies, alternatively connects a port 101 of relay valve cylinder with the spring chamber 98 or with the high pressure chamber 99. Said spring chamber 98 has a restricted outlet port 102 to the atmosphere. Constant pressure chamber 99 has inlet connection with branch pipe 84 from the main pressure supply pipe 85. A spring 103 in spring chamber 98 tends to maintain the dumb-bell piston toward the control-chamber end of the cylinder 97 and thereby normally maintain port 102 opening into the spring chamber and thus release pressure in connecting pipe 78 which in turn releases air pressure to the dumb-bell piston of control valve housing 80.

Control chamber 100 of the relay valve 77 is in constant communication with a pipe 104 from the second of the series-connected operator-manipulated trip valves 27, so that whenever the operator trips both of those valves simultaneously, air pressure is admitted to the said relay control valve and the dumb-bell piston thereof is slid to its position admitting air pressure by way of branch pipe lines 83, 84 and control valve housing to the cylinder 37 of the mechanical-pneumatic drive, thereby moving piston 38, spider 25 and the several dies carried thereby, downward. Release of the pressure actuating said parts downward and reversal of pressure to again return those parts upward, is not under direct control of the operator other than that the operator does not hold the trip valves down. After merely tripping those valves, the operator releases them which immediately cuts off further introduction of air pressure to the control chamber 100 of the relay valve. A restricted outlet port 105 from said control chamber gradually releases pressure in said chamber to the atmosphere so the spring-loaded dumb-bell valve moves in the direction of that chamber to in turn release the pressure in the control valve control chamber and reverse pressure and release conditions to cylinder 37.

Figure 15:
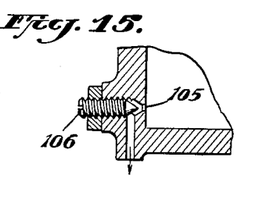
Figure 15 is an enlarged detail section illustrating an adjustable bleeder outlet construction.

The several restricted pressure-discharging outlet ports 94, 102 and 105 above described are generally of the character of bleeder vents to obtain slow recovery of desired pressure condition. The rate of bleeding of the pressure consequently determines cycle timing of operation, and it is desirable to arrange for adjustment of this timing. Said restricted outlet ports, and especially port 105 for the control chamber of the relay valve, may accordingly be provided with a regulating means, such as needle-valve 106 shown in detail in Figure 15.

Indexing of the table is obtained by pneumatic-mechanical means designated generally as indexing mechanism 26, and is coordinated with the operation of the mechanical-pneumatic drive fo rthe spider and dies thereon. Timing of air-pressure admission and exhaust to and from said pneumatic-mechanical indexing mechanism is effected by valves, identified hereinafter, operated sequentially by mechanical means dependent on the position of plunger rod or bar 41 and associated spider 25 as may be seen in the assembly showing of Fig. 1 and more in detail in Figure 13.

Figure 13:
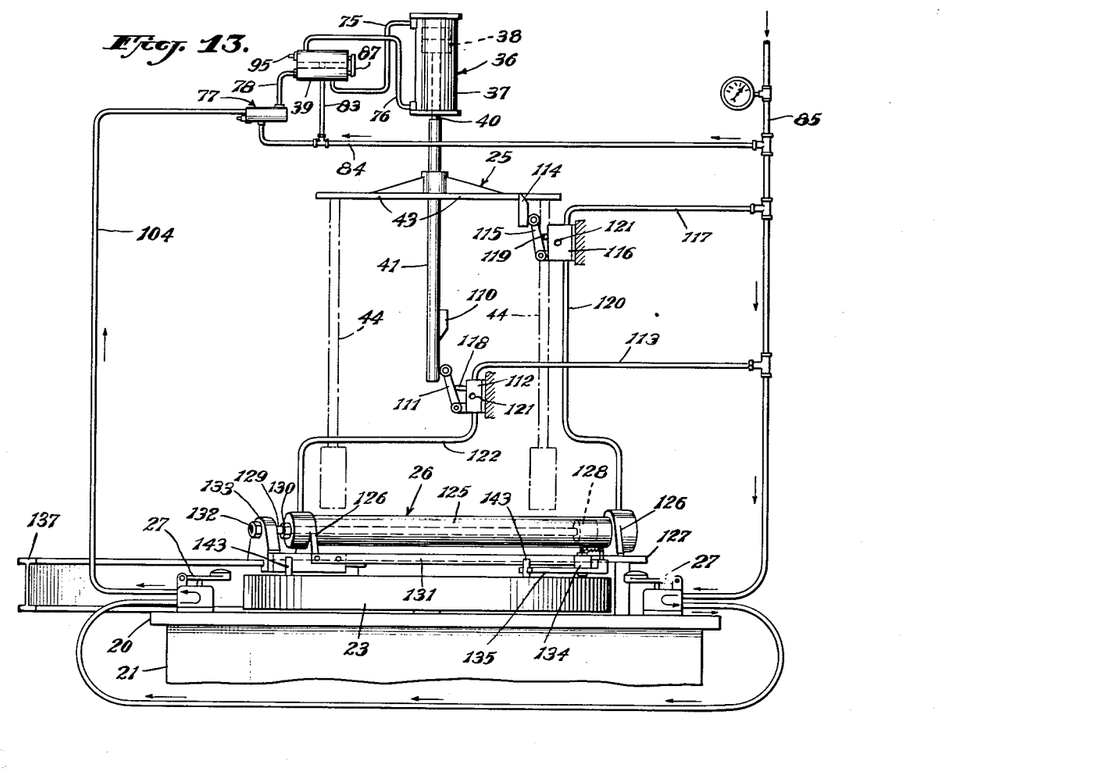
Figure 13 is a partial and broken-away elevation of the machine particularly showing the operational fluid-power lines plunger depressing mechanism and rotatable table and indexing mechanism.

Referring particularly to Figure 13, there is shown suitably near the lower end of and on the depending slide bar 41, a cam 110 for engaging a lever 111 of a three-way valve 112 having a pipe connection 113 from the high pressure main air pressure supply line 85. Also handily located, as on and depending from the spider arm 43 which carries die 52 in station 2, is a cam 114 for engaging a lever 115 of another three-way valve 116 which receives air pressure by a pipe connection 117 from main supply pipe 85. Three-way valves 112 and 116 have spring-loaded valve-stems 118, 119 respectively, which tend to project the stems normally outward toward said arms or levers 111 and 115, and which, in conjunction with operation of said levers, function to automatically open and close the valves.

A pipe 120 connects the utilization side of the upper said valve 116 to the rear end of the table-rotating pneumatic-mechanical indexing drive 26. An escape opening 121 in three-way valve 116 remains closed when valve stem 119 is pressed back by lever 115 and at the same time the said valve admits air pressure from the source to utilization pipe line 120. But when said lever 115 and valve stem 119 move outwardly from the valve housing, the supply side is closed and the utilization side is opened to the atmosphere through escape opening 121.

Similarly, another pipe 122 connects the utilization side of the lower said valve 112 to the forward end of the table-rotating pneumatic-mechanical indexing drive 26. As with valve 116 above described, so also valve 112 has an escape opening 121 which remains closed when stem 118 is pressed back by lever 111 and at which time the valve admits air pressure from the source to the utilization pipe 122. The cams and valves are so arranged that when the plunger and spider are in uppermost position the upper cam is functioning to admit air pressure to one end of the table-indexing cylinder while the valve permits escape of air pressure from the other end of that cylinder, and vice versa when the spider and plunger are in lowered position.

Figure 16:
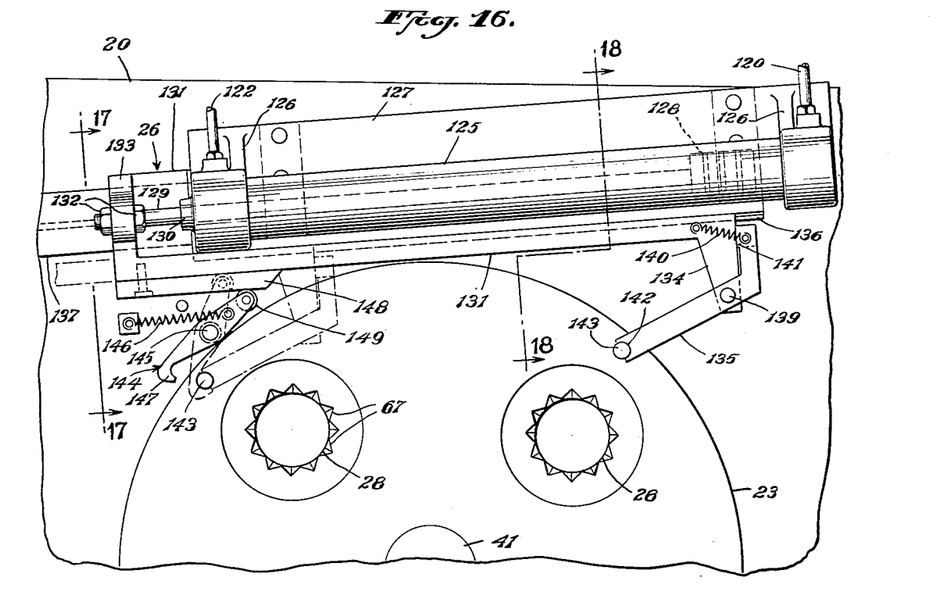
Figure 16 is a plan of a portion of the rotatable table and indexing mechanism therefor.
Figure 17:
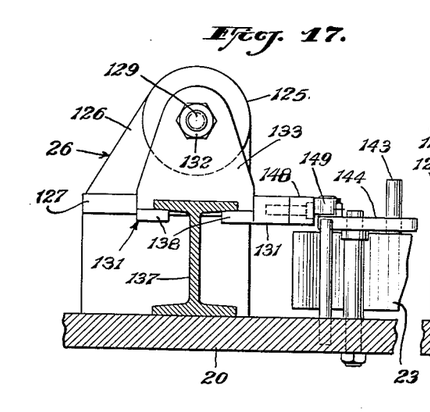
Figures 17 and 18 are sectional views of the indexing mechanism on lines 17—17 and 18—18 respectively of Fig. 16.
Figure 18:
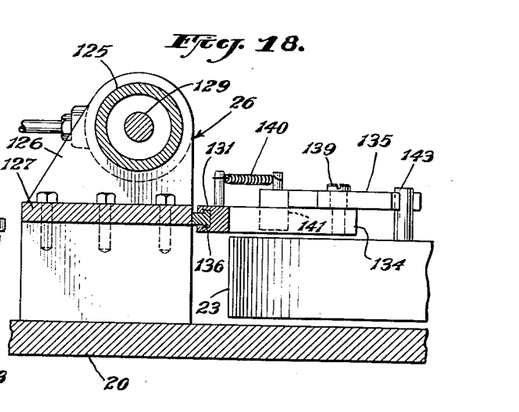

As shown in Figures 13 and 16 to 18, the indexing mechanism 26 includes a horizontally disposed cylinder 125 suitably mounted next its ends by brackets 126 to a plate 127 which in turn is bolted appropriately to platform 20. A piston 128 is provided in said cylinder 125, said piston having a piston rod 129 secured thereto and projecting from what is here termed the forward end of said cylinder, which is the end to which pipe line 122 from lower three-way valve 112 connects. Said piston rod extends axially of the cylinder and at the forward end thereof passes slidably through a suitable air-tight bushing 130. The forward external extremity of piston rod 129 is attached to a carriage 131, as by being threaded and by two lock nuts 132 thereon. As shown in Figure 16, said carriage 131 is a structure about as long as and parallel to the cylinder and provided at its end next the forward end of piston rod 129 with an upstanding bracket or end section 133 of generally triangular configuration for attachment of said piston rod thereto. At the other or rear end of said carriage is a lateral bracket 134 projecting in a direction generally toward the rotatable work table, but at elevation sufficient for it to move across the table in a chordal direction. A table-rotating driving pawl 135 is pivoted to said lateral bracket 134.

Said carriage is, in most part, next to the longitudinal side edge of cylinder-supporting plate 127, and a T-shaped track 136 is provided along that edge of the plate, said carriage having a corresponding T-shaped groove along its edge toward the plate to suitably engage with and slide longitudinally of said track. As a forward part of the carriage projects beyond the end of the plate and track, said forward part is conveniently made of adequate width to underlie the forward external extremity of the piston rod and to provide the upstanding bracket or end section 133.

As the piston rod has a long stroke, it is desirable to keep the front end from suffering from any deflecting influences. For that purpose, I have shown a support and guide for the widened forward end part of the carriage, comprising an I-beam member 137 parallel to and underlying the axis of the piston rod and cylinder forwardly beyond the cylinder and of adequate length to accommodate full stroke of the piston with the forward end part of the carriage always over said I-beam. Said forward part of the carriage has supporting contact with the top flange of the I-beam and is provided with lugs 138 engaging at the edges of and underlying said flange in slidable engagement therewith for keeping the carriage in a straight path of movement and for preventing the carriage from twisting.

Aforementioned pawl 135 is in the form of a first class lever intermediately pivoted at 139, with a short arm shown, in normal position, substantially perpendicular to the piston rod axis, and with a longer driving arm sloping obliquely toward the table. A spring 140 draws said pawl to its said normal position, which is defined by presence of stop means to limit swinging of the pawl in the direction of influence of the spring. The stop means shown, comprises a depending projection 141 at the end of the short arm and which comes into engagement with the edge of the lateral bracket 134 to which the pawl is pivoted.

The driving end of the longer or driving arm of the pawl 135 has an appropriate semi-circular or other socket 142 provided thereat to engage any one of a plurality of work-table pins 143 which project upwardly from the work table 23 in equi-spaced circular arrangement, and each near the periphery of said table in proximity one to each mould 28. Since there are four moulds and four stations in the present showing, there are appropriately four of the pins. At indexed position of the table, a pin 143 stands directly in the path of and next to the socketed end of the pawl. To index the table to its next station, the piston 128, carriage 131 and pawl 135 are moved forwardly, the pawl pushing against the pin and swinging laterally to compensate for the arcuate path followed by the pin as the table rotatably advances.

In order to stop rotary advancement of the table at its precise indexed position, a releasable latch 144 is provided and arranged to be in position in the path of one of the approaching pins 143 each time the table is indexed. According to the present showing, said latch is a first class lever pivoted at 145 to the platform next to the periphery of the table. A spring 146 is attached to the latch and tends to swing one end of the latch toward the carriage and to swing the other end of the latch over the peripheral margin of the table having thereat a hook 147 directly in the path of the approaching pin 143. In order to release the latch from the engaged pin to permit a subsequent indexing of the table, the forward end portion of the carriage is provided with a cam piece 148 at its side edge toward the table and the end of the latch toward said carriage edge has a roller 149 which will be engaged by said cam piece in retracted position of the carriage and hold the hooked end of the latch swung away from the table and out of the path of forward movement of the adjacent pin until the pin has passed the latch, whereupon the cam piece ceases to be in engagement with the roller so the hooked end of the latch returns to its pin-stopping status.

For the purpose of assuring that the table remain precisely at its indexed position until positively actuated to its next position by the above-described pawl, a spring-loaded detent 150 may be provided. This detent seats in an appropriate notch 151 in the periphery of the table, there being a notch in properly registering position for each station to which the table is to be indexed.

I claim:

1. A machine of the character described, comprising a table having a mould therein opening at the upper face of said table, said mould having a serrated upper margin extending outwardly at the said upper face of the table and adapted to receive a member to be formed across said mould and serrations, a die having a sleeve depressable against a marginal portion of said member superposed on said serrations, and a plunger projectable through the sleeve, said plunger being smaller than the sleeve thereby providing a peripheral gap therebetween, and the end of said plunger being engageable with said member for depressing the member into the mould and dragging said margin of said member entirely across the serrations and entirely into said mould while subjected to pressure of said sleeve for creasing and folding said margin of said member as it enters said mould.

2. A die of the character described, comprising an elongated metallic body having a hollow lower portion providing a bottom rim thereto, a plunger in said hollow portion of the said body and projecting below said bottom rim, a compression spring in said hollow body above said plunger tending to depress the plunger, and a slidable outer sleeve about the lower portion of said body and plunger and flaring at its lower end and spaced from the plunger radially at the portion of the plunger projecting below said rim, and means limiting travel of said plunger in said body maintaining projection of said plunger below said bottom rim.

3. A machine of the character described, comprising a table having a mould therethrough, said mould having a peripheral enlargement at its bottom, means for closing the bottom of said enlargement, and die means of less diameter than said enlargement for introducing elements of the article being manufactured to be formed from top to bottom of said mould into said enlargement, said die means having means for receiving the margin of said article and means for pushing against the edge of one of said elements next to said margin in the direction of projection of said margin and thereby adapted to spread said elements to substantially the size of said enlargement.

4. A machine of the character described, comprising a table having a mould therethrough, said mould having a side wall and a peripheral enlargement at its bottom, means for closing the bottom of said enlargement, die means for introducing elements of the article being manufactured from top to bottom of said mould into said mould with an edge margin of one of said elements against said side wall, said die means having a body rim engageable with the edge of said margin of said one element and movable in the direction of said margin for pushing said margin into said enlargement, a plunger engageable with another of said elements of the article, and another die for applying heat and pressure to the elements assembled by the first said die means in said mould.

5. A machine of the character described, comprising a table having a mould therethrough, said mould having a side wall and a peripheral enlargement at its bottom, means for closing the bottom of said enlargement, die means for introducing elements of the article being manufactured from top to bottom of said mould into said mould with an edge margin of one of said elements against said side wall, said die means having a body rim engageable with the edge of said margin of said one element and movable in the direction of said margin for pushing said margin into said enlargement, a plunger engageable with another of said elements of the article, a second die for applying heat and pressure to the elements assembled by the first said die means in said mould, and another heat die for applying a further element to said article.

6. In the manufacture of a power puff including a facing member having its perimeter overlapping the perimeter of a filler in the puff, a work table having a mould therein, a platform underlying said work table and closing the lower end of said mould, said mould having a peripheral enlargement at the end thereof next to said platform, means at the other end of said mould for positioning a facing member in symmetrical relation to said bore, means for applying a filler at the top mid portion of said facing member, a plunger for forcing said facing member and filler into said mould and compressing the mid portion of said member into contact with said platform and causing said facing member to form a peripheral wall confined within said mould and around said plunger and filler, and means insertable into said mould peripherally of said plunger and above said peripheral wall and movable downwardly toward the upper end of said wall for forcing said wall out of its confinement between the mould and plunger into said enlargement and into overlapping relation to the perimeter of said filler.

7. In the manufacture of a powder puff including a facing member having its perimeter overlapping the perimeter of a filler pad, a work table having a mould therein, a platform underlying said work table and closing the lower end of said mould, said mould having a peripheral enlargement at the end thereof next to said platform, means at the other end of said mould for positioning a facing member and a filler pad thereon in symmetrical relation to said mould, depressible means for forcing said member and pad into said mould and compressing a portion thereof into contact with said platform causing said facing member to form a peripheral wall within and confined by said mould around said depressible means and filler pad and extending above said enlargement, and means operable between said mould and depressible means for forcing said wall from within the confinement of said mould and depressible means into said enlargement and into overlapping relation to the perimeter of said filler pad.

8. In the manufacture of a powder puff including a circular facing member having its perimeter overlapping the perimeter of a filler pad, a work table having a cylindrical mould therein, a platform underlying said work table and closing the lower end of said mould, said mould having a peripheral enlargement at the end thereof next to said platform and defined by said table and said platform, means at the other end of said mould for positioning a facing member and a filler pad thereon in symmetrical relation to said mould, means for forcing said member and pad into said mould and compressing a portion thereof into contact with said platform causing said facing member to form a peripheral wall within said mould and around said filler pad, and means for forcing said wall into said enlargement and into overlapping relation to the perimeter of said filler pad.

9. In the manufacture of a powder puff including a circular facing member having its perimeter overlapping the perimeter of a circular filler pad, a work table having a cylindrical mould therein, a platform underlying said work table and closing the lower end of said mould, said mould having a peripheral enlargement at the end thereof next to said platform and defined by said table and said platform, means at the other end of said mould for positioning a facing member and a filler pad thereon in axial alignment with said mould, depressible means for forcing said member and pad into said mould and compressing a portion thereof into contact with said platform causing said facing member to form a peripheral wall within and retained by said mould and around said filler pad and depressible means, and a sleeve operable in conjunction with said depressible means for forcing said wall from its retention between said mould and depressible means into said enlargement and into overlapping relation to the perimeter of said filler pad.

10. A machine for the manufacture of a powder puff consisting of a facing member and a filler pad, comprising a work table having a cylindrical forming mould therein, a platform underlying said work table, said mould having a peripheral enlargement at the end thereof next to said platform, a plunger of lesser diameter than said mould and in axial alignment therewith, a sleeve on said plunger, said sleeve having an internal diameter slidably fitting said plunger and an external diameter slidably fitting said mould, said work table having a surface surrounding the other end of said mould to receive a facing member with a pad thereover in symmetrical relation to said mould, means for moving said plunger to engage an end thereof with said pad and force said facing member and pad into said mould and in contact with said platform proximate to said enlargement with a portion of said facing member forming a collar surrounding said plunger end, and means for actuating said sleeve to compress said collar into said enlargement and in overlapping relation to the perimeter of said pad.

11. A machine for the manufacture of a powder puff consisting of a facing member and a filler pad, comprising a work table having a cylindrical forming mould therein, a platform underlying said work table, said mould having a peripheral enlargement at one end thereof defined by said work table and said platform, a plunger of lesser diameter than said mould and in axial alignment therewith, a sleeve on said plunger, said sleeve having an internal diameter slidably fitting said plunger and an external diameter slidably fitting said mould, said work table having a surface radiating from the other end of said mould to support a facing member with a pad thereover in symmetrical relation to said mould, means for moving said plunger to engage an end thereof with said pad and force said facing member and pad into said mould and in contact with said platform to partially fill said enlargement with a portion of said facing member forming a collar surrounding said plunger end, and means for actuating said sleeve to compress said collar into said enlargement and in overlapping relation to the perimeter of said pad.

12. A machine for the manufacture of a powder puff consisting of a circular facing member and a circular filler pad, comprising a work table having a forming mould therein, a platform underlying said work table, said mould having a peripheral enlargement at the end thereof next to said platform and defined by said work table and said platform, a plunger of lesser diameter than said mould and in axial alignment therewith, a sleeve on said plunger, said sleeve having an internal diameter slidably fitting said plunger and an external diameter slidably fitting said mould, said work table having a surface radiating from the other end of said mould to support a facing member with a pad thereover in axial alignment with said mould and plunger, means for moving said plunger to engage an end thereof with said pad and force said facing member and pad into said mould and in contact with said platform proximate to said enlargement with a portion of said facing member forming a collar surrounding said plunger end, and means for actuating said sleeve to compress said collar into said enlargement and in overlapping relation to the perimeter of said pad.

References Cited in the file of this patent

UNITED STATES PATENTS

| Number | Name | Date |
|---|---|---|
| 699,051 | Wilson | Apr. 29, 1902 |
| 718,378 | Painter | Jan. 13, 1903 |
| 1,668,349 | Baum | May 1, 1928 |
| 1,845,257 | Ferris | Feb. 16, 1932 |
| 1,861,742 | Hand | June 7, 1932 |
| 2,021,580 | Osgood | Nov. 19, 1935 |
| 2,166,716 | Chandler | July 18, 1939 |
| 2,221,197 | Martin | Nov. 12, 1940 |
| 2,337,695 | Valentine | Dec. 28, 1943 |
| 2,394,769 | Heckethorn | Feb. 12, 1946 |
| 2,449,008 | Pecker | Sept. 7, 1948 |
| 2,466,643 | Magid | Apr. 5, 1949 |
| 2,484,336 | Epstein et al. | Oct. 11, 1949 |
| 2,490,451 | Magid | Dec. 6, 1949 |
| 2,509,266 | Epstein et al. | May 30, 1950 |
| 2,568,956 | Fienberg | Sept. 25, 1951 |
| 2,618,292 | Ring | Nov. 18, 1952 |
| 2,618,982 | Mead | Nov. 25, 1952 |
| 2,621,363 | Fienberg | Dec. 16, 1952 |
| 2,655,692 | Fay | Oct. 20, 1953 |
| 2,661,498 | Blaurock | Dec. 8, 1953 |